Inventor
Irus M. Wells

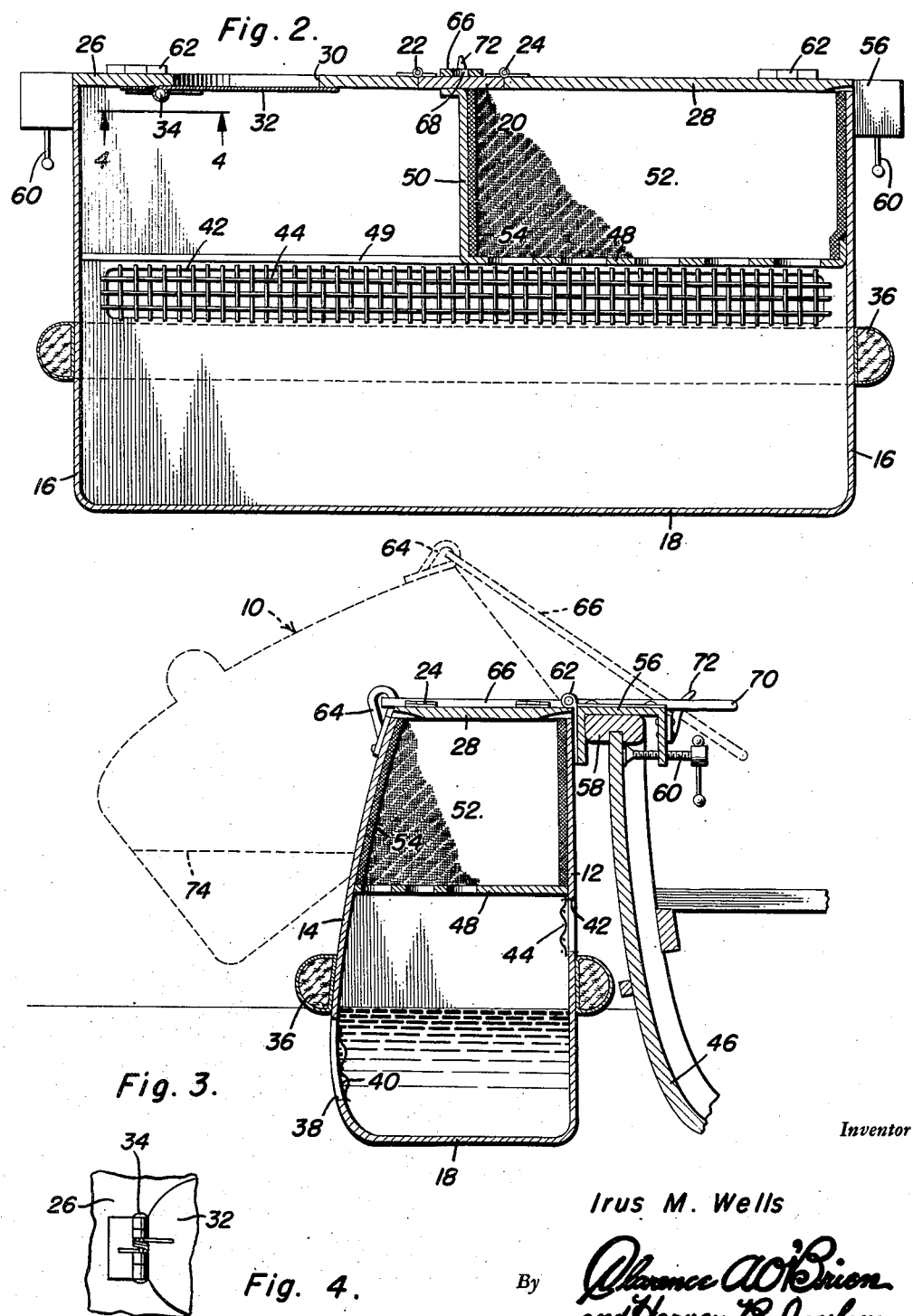

Patented July 10, 1951

2,560,054

UNITED STATES PATENT OFFICE 2,560,054

BOAT CREEL

Irus M. Wells, Redmond, Oreg.

Application January 21, 1949, Serial No. 71,788

8 Claims. (Cl. 43—55)

This invention relates to new and useful improvements in fishing apparatus and more particularly to creels.

The primary object of the present invention is to provide a creel or receptacle for fish that will retain the fish in a live and fresh condition in the same water from which the fish were taken, and which will permit the same to be kept in this condition until completion of the angling or fishing trip, or until it is desired that the fish be dressed and packed, thereby eliminating to the greatest possible extent premature spoilage, discoloration and drying out of the catch.

Another important object of the present invention is to provide a creel into which the freshly taken or caught fish may be immediately placed while still alive, and embodying novel and improved means for attaching the creel to the side of a boat so that the fish will not come into contact with any part of the interior of the boat, and thereby eliminating the customary fish slime, blood and odor which normally prevails when the caught fish are placed in the interior of a boat.

A further object of the present invention is to provide a boat creel including a receptacle having a buoyant body thereabout for retaining a portion of the receptacle above a fluid medium, and a cooling compartment disposed in the upper portion of the receptacle having a perforated bottom wall so that the cool air rising from the lower portion of the receptacle, which is disposed below the water surface to receive water, will pass into the compartment.

Other objects and advantages reside in the details of construction and operation as more fully hereinafter described and claimed, reference being had to the accompanying drawings forming a part hereof, wherein like numerals refer to like parts throughout, and in which:

Figure 2 is a longitudinal vertical sectional view taken substantially on the plane of section line 2—2 of Figure 1;

Figure 1:
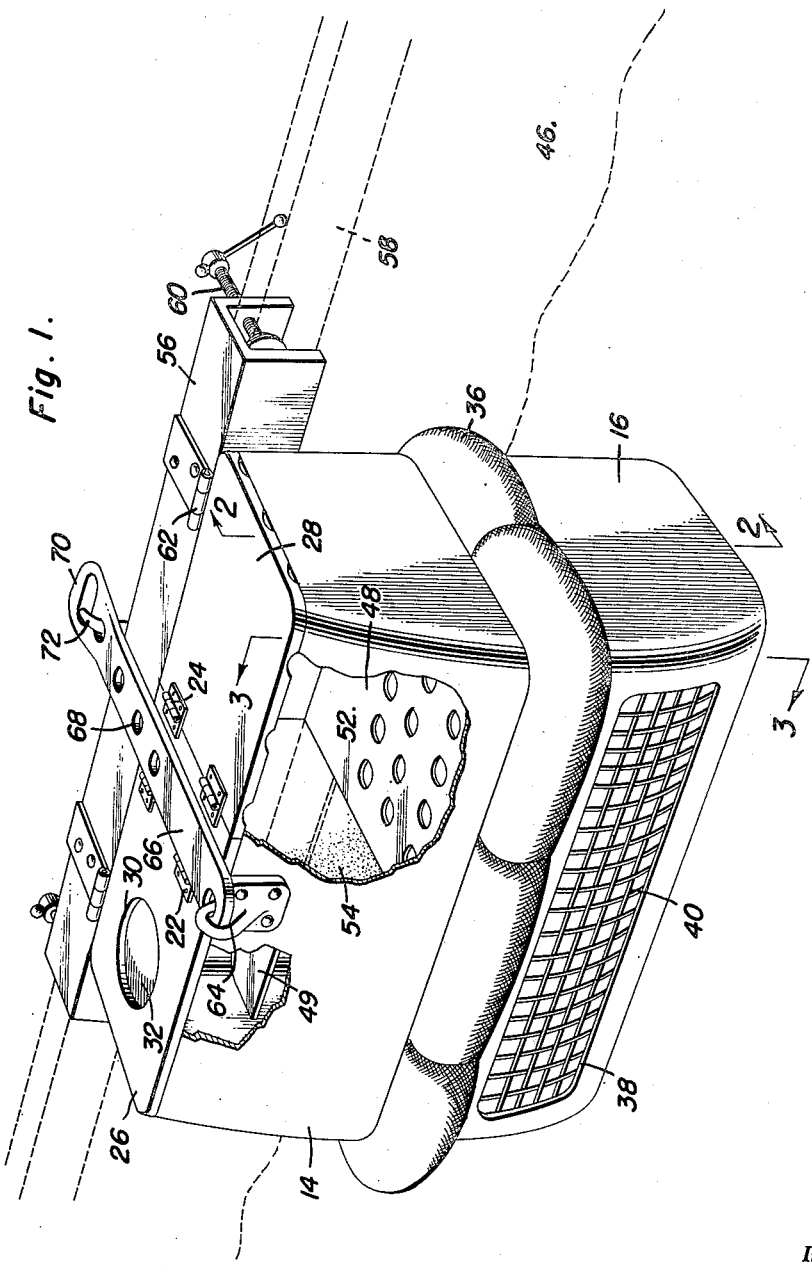
Figure 1 is a perspective view of the present invention and showing the same applied to the side of a boat (in dotted lines) and with parts of the present creel broken away for the convenience of explanation.

Figure 3 is a transverse vertical sectional view taken substantially on the plane of section line 3—3 of Figure 1, showing the same applied to the side of a boat, and with dotted lines showing the position of the receptacle in a raised position and the water level of the liquid in the receptacle when the same is raised; and Figure 4 is a view taken substantially on the plane of section line 4—4 of Figure 2.

Referring now to the drawings in detail, wherein for the purpose of illustration, there is disclosed a preferred embodiment of the present invention, the numeral 10 represents an elongated receptacle or container generally, of any suitable rust-resistant material, having an open upper end, inner and outer side walls 12 and 14, end walls 16 and a bottom wall 18.

Extending between the upper edges of the side walls 12 and 14, and substantially midway between the end walls 16, is an upper anchoring strip or wall 20 to which there is hinged, as at 22 and 24, respectively, the inner portions of a pair of substantially rectangular closures or lids 26 and 28 the outer portions of which are normally supported on the upper edges of the end walls 16 to close the upper end of the receptacle 10.

The closure 26 is provided with a central opening 30 that is normally closed by an auxiliary closure 32. The auxiliary closure 32 is hinged to the under surface of the closure 26 by a spring type hinge 34 that normally urges the closure 32 to a raised and closed position. It is understood that the closure 32 will pivot downwardly under the weight of a fish applied thereon so that the fish will pass into the lower portion of the receptacle.

A buoy ring or buoyant member 36 of any suitable buoyant material, such as cork, embraces the receptacle 10 adjacent the lower portion thereof, above the center of gravity and above the water line, and will keep the upper portion of the receptacle above the water should the receptacle become detached from the boat, or when the receptacle is not secured to the boat. The member 36 also makes the instant invention an emergency life preserver.

A longitudinal opening 38 is provided in the side wall 14, below the member 36 and is provided with a screen or grid 40 that will permit water to enter the receptacle and which will prevent fish in the receptacle from passing outwardly therefrom.

The side wall 12 is also provided with a longitudinal opening 42 disposed above the member 36 and which is provided with a screen or grid 44. This latest opening will permit a ready supply of cool shaded air to enter the receptacle from the water surface between the receptacle and the boat 46. This opening will also limit the amount of water entering the receptacle through the opening 38 and the amount of water retained in the receptacle when the same is raised or tilted in a manner presently to be described.

Disposed beneath the closure 28 is a perforated partition or wall 48 having one end fixed to one end wall of the receptacle. An upstanding extension 50 is provided at the free end of the wall 48 and is suitably secured to the strip 20 to provide an upper compartment 52. It should be noted, that the wall 48 is disposed above the opening 42 so that cool air entering and rising in the receptacle will pack into the compartment 52 to retain edibles placed therein in a cool, fresh state.

To further aid the above desired function, the walls forming the compartment 52, except the wall 48, are lined with a suitable moisture retaining material or insulating material 54.

The numeral 56 represents a channel-shaped base member that receives a portion 58 of the boat 46 and which adjustably supports a plurality of clamping screws 60 for bearing against the portion 58 to retain the base member relative thereto. This base member is secured to the upper portion of the side wall 12 by a hinge 62 for vertical swinging movement of the receptacle 10 relative to the boat. One half of the hinge 62 is secured by fasteners or the like to the upper portion of the side wall 12 and the other half of the hinge 62 is secured by fasteners or the like to the base member.

To the upper portion of the side wall 14, there is suitably secured an eye staple or loop 64 that swingably supports one end of a retaining or locking arm 66. The free end of the arm 66 is provided with a plurality of longitudinally spaced openings 68 and a hand grip 70.

Projecting laterally from the base member 56, is a rigid holding lug 72 that is received in a selected one of the openings 68 in order to retain the receptacle in a vertically inclined position as shown in dotted lines in Figure 3.

In practical use of the present invention, the lower portion of the receptacle 10, or the portion thereof below the member 36, is disposed in the water and therefore water enters the receptacle through the opening 38. However, when the receptacle is raised or tilted, see dotted lines Figure 3, so that the same is above the water, a quantity of water will still be retained in the receptacle to the water level 74 and any excess water will pass out of the receptacle through the opening 42.

Obviously, the instant invention is applicable for any type of boat or floating object as well as a shore structure and may be so employed without deviating from the scope suggested by the same.

It should be noted, that the wall 48 is provided with an elongated, relatively narrow extension 49 that extends under the lid 26 to constitute a baffle and prevent any liquid in the container from passing through the lid 26 and into the boat as the liquid in the container is poured from the container through the opening 42.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A boat creel comprising a base member, means for removably securing the base member to a portion of a boat, a container hinged to said base member for substantially vertical swinging movement, and means carried by said container and engageable with said base member retaining said container in a selected vertically inclined position, said last named means including an arm swingably mounted on said container and having a plurality of openings, said base member including a locking arm receivable in a selected one of said openings.

2. A boat creel comprising a base member, a container hingedly carried by said base member and adapted to be disposed at one side of a boat, said container having upper and lower walls, a buoyant member embracing said container and located between the upper and lower walls of the container for retaining the upper portion of the container above a fluid medium, a substantially horizontal, perforated partition provided in said container, and a compartment provided in said container for storing edibles, said partition forming a bottom wall for said compartment.

3. The combination of claim 2, wherein said compartment is disposed above said buoyant member.

4. A boat creel comprising a base member, means detachably securing said base member to a supporting structure, a container having upper and lower portions, means pivotally securing the upper portion of said container to said base member, a buoyant member embracing the container adjacent the lower portion thereof and adapted to retain the upper portion of said container disposed above a fluid medium, the lower portion of said container including a screened opening disposed beneath the buoyant member for permitting water to enter the container, and means for locking said container to said base member in an inclined position to retain water in said container without passing outwardly from the screened opening when the container is disposed above a fluid medium.

5. The combination of claim 4, wherein said last mentioned means includes an arm swingably mounted on said container and having a plurality of spaced openings, and a locking arm carried by said base member received in a selected one of the openings in said first-named arm.

6. The combination of claim 4, and a cooling compartment provided in the upper portion of said container and having a perforated bottom wall and insulated sides.

7. A bait holder for boats comprising a support, a container having upper and lower portions, means pivotally securing the upper portion of said container to said support, a buoyant member embracing the container adjacent the lower portion thereof and adapted to retain the upper portion of said container disposed above a fluid medium, the lower portion of said container including a screened opening disposed beneath the buoyant member for permitting water to enter the container, and means for locking said container to said support in an inclined position to retain water in said container without passing outwardly from the screened opening when the container is disposed above a fluid medium.

8. A boat creel comprising a support, means detachably securing said support to a boat, a container having upper and lower portions and inner and outer side walls, means pivotally securing the upper portion of said inner side wall to said support, a buoyant member embracing the container adjacent the lower portion thereof and adapted to retain the upper portion of said container disposed above a fluid medium, the lower portion of said container including an opening disposed beneath the buoyant member for permitting water to enter the container, said opening being located in the outer side wall of said container, the inner side wall of said container having an outlet opening disposed above the buoyant member for permitting water in the container to pass therefrom upon raising of the container, a compartment provided in the upper portion of said container and including a bottom wall disposed above the opening in said inner side wall, and a connection between the upper portion of said container and said support for retaining the container in an inclined position to retain water in said container without passing outwardly from the opening in said outer side wall or the opening in said inner side wall.

IRUS M. WELLS.

REFERENCES CITED

The following references are of record in the file of this patent:

UNITED STATES PATENTS

| Number | Name | Date |
| --- | --- | --- |
| 307,375 | Busche | Oct. 28, 1884 |
| 521,244 | Muncaster | June 12, 1894 |
| 768,874 | Paar | Sept. 13, 1904 |
| 980,790 | Johnson | Jan. 3, 1911 |
| 1,693,170 | Alsop | Nov. 27, 1928 |
| 2,127,744 | Linthwaite | Aug. 23, 1938 |
| 2,367,588 | Kruse | Jan. 16, 1945 |
| 2,384,101 | Kruse | Sept. 4, 1945 |
| 2,485,684 | Alldredge | Oct. 25, 1949 |